United States Patent [19]
McMahon

[11] 3,980,451
[45] Sept. 14, 1976

[54] GASIFICATION PROCESS

[75] Inventor: Joseph F. McMahon, Clinton, N.J.

[73] Assignee: Foster Wheeler Energy Corporation, Livingston, N.J.

[22] Filed: Apr. 21, 1975

[21] Appl. No.: 570,127

Related U.S. Application Data

[63] Continuation of Ser. No. 383,859, July 30, 1973, abandoned.

[52] U.S. Cl. .............................. 48/197 R; 48/201; 48/212; 48/213
[51] Int. Cl.² ...................... C10J 3/46; C10G 13/30
[58] Field of Search ............... 48/197 R, 202, 210, 48/201, 211, 212, 213, 214, 215; 252/373

[56] References Cited
UNITED STATES PATENTS

| | | | |
|---|---|---|---|
| 2,684,896 | 7/1954 | Coghlan | 48/215 |
| 2,912,315 | 12/1959 | Haney | 48/212 |
| 3,019,096 | 1/1962 | Milbourne | 48/213 |
| 3,732,085 | 5/1973 | Carr et al | 48/214 |

*Primary Examiner*—S. Leon Bashore
*Assistant Examiner*—Peter F. Kratz
*Attorney, Agent, or Firm*—Marvin A. Naigur; John E. Wilson

[57] ABSTRACT

A process for the gasification of carbonaceous materials to produce a high B.T.U. gaseous product is disclosed. The process includes the partial oxidation of a fluid hydrocarbon to produce a gaseous mixture of carbon monoxide and hydrogen, followed by contacting the gaseous mixture with a relatively cool, finely-divided carbonaceous solid material. The resulting gas-solid mixture is then passed along with a carbonaceous feed into a high velocity transfer line reactor furnace, and the solid material is removed from the gas-solid mixture which emerges from the reactor furnace. The present invention is particularly well suited for the hydrogasification of high boiling, carbon-rich feedstocks such as reduced crude oils.

6 Claims, 1 Drawing Figure

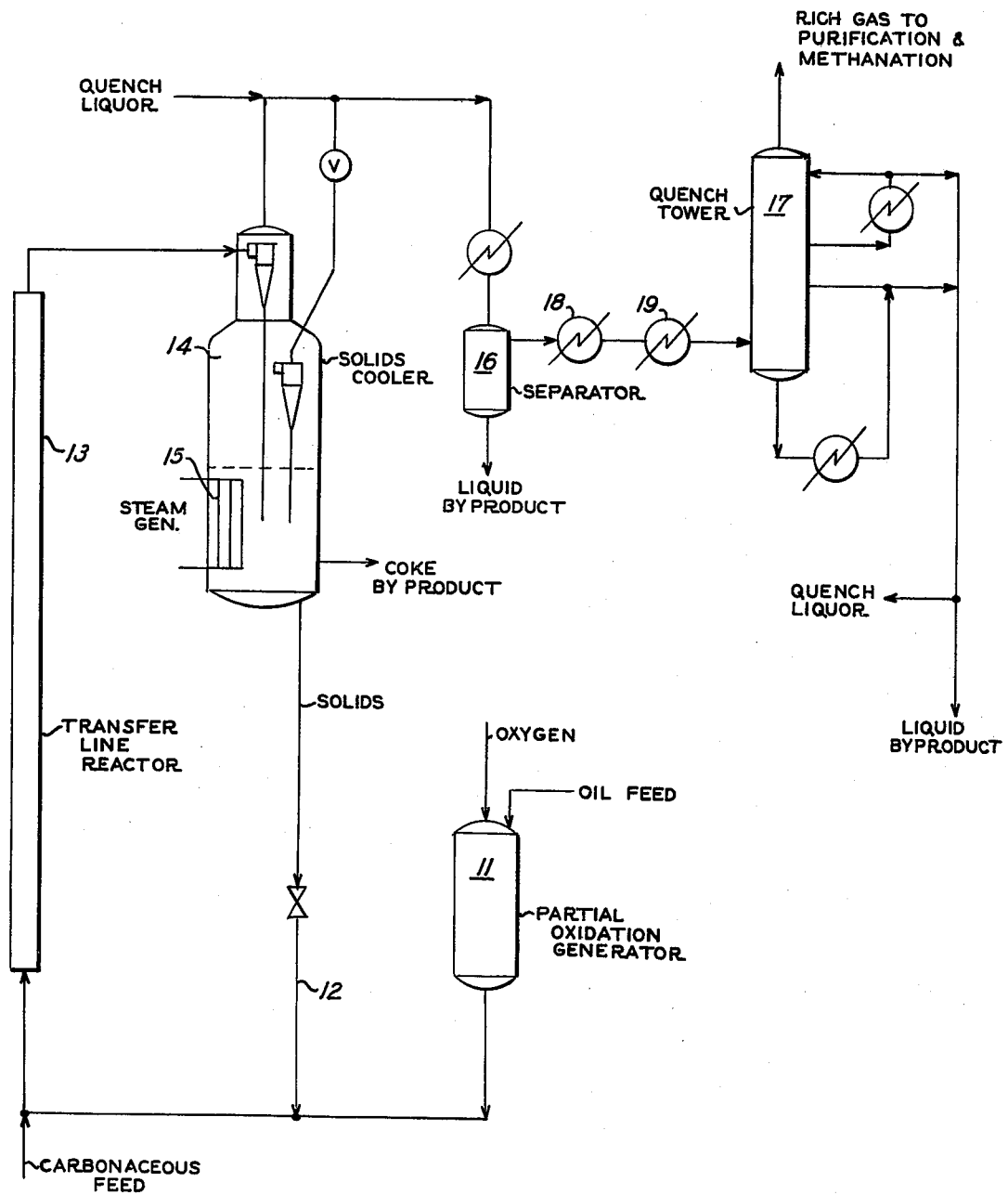

GASIFICATION PROCESS

This is a continuation of application Ser. No. 383,859, and now abandoned filed July 30, 1973.

BACKGROUND AND SUMMARY OF THE INVENTION

The present invention provides a process for the gasification of carbonaceous materials to produce a high B.T.U. gaseous product. The process of the present invention is particularly useful for converting hydrocarbon-containing feedstocks to high B.T.U. gas by hydrogasification reactions.

Prior art methods of gasifying carbonaceous materials have primarily involved reacting a hydrocarbon feedstock and a hydrogen rich gas at elevated temperatures and pressures to produce a gaseous product containing methane and ethane as major components. The hydrogasification reactions are carried out in an empty reaction zone, as in the gas recycle hydrogenation process or in a fluidized bed, as in the fluidized bed hydrogenation process.

A major disadvantage of the above-mentioned processes is that the reaction is not thermally self-sustaining when high boiling, carbon-rich feedstocks such as reduced crude oils are gasified. The heat evolved by the hydrogasification of high boiling, carbon-rich feedstocks is not sufficient to maintain a minimum reaction temperature of about 1400°F even when the reactants are preheated to the practical limit. It is possible to generate additional heat in the reaction zone by introducng an oxygen-containing gas into the reaction zone. This is not, however, a satisfactory method of operation because of the possibility of explosive reaction between oxygen and hydrogen gas which is also present in the reaction zone.

Another disadvantage of previous methods of hydrogasification is that the hydrogen required for the reaction is produced in a separate process such as, for example, partial oxidation of carbonaceous materials. The partial oxidation process produces a hydrogen-carbon monoxide gas containing at least 40 mole % hydrogen, at temperatures of 2000°–3000°F as a result of the partial combustion of the carbonaceous material with an oxygen-containing gas. The high temperature gas is conventionally cooled down to (1) separate a small amount of soot from the gas, (2) react carbon monoxide and steam to produce carbon dioxide and hydrogen, and (3) remove $H_2S$ and $CO_2$ from the gas to produce hydrogen-rich gas. When the partial oxidation process is used to produce hydrogen for hydrogasification processes, the hydrogen-rich product gas must be reheated to elevated temperatures suitable for the hydrogasification process. As a result, the heat contained in the high temperature partial oxidation generator gas can only be partially recovered as steam which cannot be effectively utilized in the plant and expensive fuel is consumed in reheating the hydrogen-rich gas for the hydrogasification process.

By the present invention there is provided a method for overcoming the above-mentioned disadvantages of previous methods. The process of this invention involves the following essential steps:

1. Partial oxidation of carbonaceous material with an oxygen-containing gas to produce a hydrogen-carbon monoxide gas at a temperature between about 2000° and about 3000°F;

2. Contacting high temperature gas from the partial oxidation generator with relatively cool, finely-divided carbon particles to produce a gas-solid mixture at a temperature between about 1500° and about 2000°F;

3. Introducing carbonaceous feed into the gas-solid mixture in a high velocity transfer line in which the contact time of the feed-gas-solid mixture is between about 0.05 and about 5 seconds, preferably between about 0.25 and about 1.0 second, so that hydrogasification of the feed is obtained; and 4. Separating solids from the gas-solid mixture at the outlet of the transfer line, cooling the separated solids, and returning cooled solids to mix with hot gas from the partial oxidation generator.

The high B.T.U. gases which may be produced by the method of the present invention are those gases having in excess of about 400 B.T.U. per cubic foot, and a specific gravity of about 0.5 to 0.8, preferably below about 0.70. Such a gas is generally known and is herein referred to as a high B.T.U. gas.

DESCRIPTION OF THE PREFERRED EMBODIMENTS

Referring to the sole FIGURE of the drawings, there is shown a schematic representation of the gasification process of the present invention. In the partial oxidation procedure, a gaseous or liquid fuel, preferably a hydrocarbon fuel or a mixture of such fuels, is fed into a partial oxidation generator chamber 11 where the fuel is converted into carbon monoxide and hydrogen by partial oxidation with oxygen or gases containing oxygen.

The hot gases from the partial oxidation chamber 11 emerge at a temperature of about 2000° to 3000°F. The gases, primarily a mixture of carbon monoxide and hydrogen in about a 1:1 ratio, are fed to an adjacent standpipe 12 through which a source of relatively cool, finely-divided carbon particles is provided to mix with the gas mixture from the oxidation chamber 11. The carbon particles may be coke, mineral coal or a similar solid carbonaceous material, preferably having a particle size small enough for fluidization purposes. The particle size may be about 100 to 5000 microns, preferably about 100 to 1000 microns, in diameter. The addition of the carbon particles lowers the temperature of the resulting gas-solid mixture to about 1500° to 2000°F and preferably about 1700° to 1900°F. The gas-solid mixture is then fed into a transfer line reactor furnace 13 along with a carbonaceous feed such as a hydrocarbon stock, as shown in the drawing. The amount of solid material introduced into the gas from the partial oxidation generator 11 is dependent upon the amount of carbonaceous feed added. The weight ratio of solids to carbonaceous feed should be at least 5:1 and preferably 30–40:1. This ratio is important since some carbonaceous feeds will coke and plug up the transfer line reactor if not dispersed among an adequate quantity of absorbent solid particles. The ratio of partial oxidation gas to the carbonaceous feed introduced into the transfer line reactor should be such that the resulting hydrogen-to-oil ratio corresponds to 25 to 100% of that required to convert all of the carbonaceous feed to methane.

The preferred types of carbonaceous feeds employed in this step of the present invention are the readily available oil residues, natural gas and waste oils. The present process is particularly well suited for use with high boiling, carbon rich feedstocks such as reduced crude oils.

Hydrogasification of the feed in the reactor furnace 13 is advantageously carried out by maintaining a velocity of vapors and solids of at least 10 feet/second and preferably 30–50 feet/second and providing a material residence time at a temperature of about 1500° to 2000°F in the transfer line reactor of about 0.05 to 5 seconds, preferably about 0.25 to 1.0 second. Velocities in the preferred range are required to maintain smooth upward flow of solids and gas in the transfer line reactor. The reactor furnace 13 is a cylindrical vertically oriented vessel having a length and diameter appropriate for maintaining the preferred velocity and residence time and is preferably essentially straight so as to provide a linear path for the passage of the reactants in order that the contact time of the reactants may be strictly controlled.

Upon emerging from the reactor furnace 13, the mixture of gases and solids is passed into a solids cooler 14 containing suitable steam generating equipment 15. The solid material is separated from the gas-solid mixture by appropriate separating equipment such as a plurality of centrifugal or gravity-type separators arranged in series and located in the cooler 14. Heat transferred from the solids may be employed to generate steam in generating equipment 15 for use elsewhere in the system. The cooled solid particulate material leaving the bottom of the last separator enters a dense phase fluidized bed maintained at the bottom of the solids cooler 14 and then is returned to the solids standpipe 12 by means such as a gravity flow metered device, with the solid material thus being available for mixing with additional gas produced in the partial oxidation generator chamber 11. The solids are cooled in the cooler 14 to a temperature which will give the gas-solids mixture as it approaches the transfer line reactor 13 a temperature between about 1500° and 2000°F, preferably about 1700° to 1900°F, as described previously. Any oil from the carbonaceous feed which is not gasified is converted to coke particles and fed from the solids cooler 14 to the partial oxidation system where they are gasified.

The process as described above may be operated at either atmospheric or superatmospheric pressures up to 2000 psig. or higher. High pressures are favorable to methane formation which increases the BTU content of the product gas. The preferred operating pressure range for this process is 500 to 1500 psig.

After separation of the solid material, the gaseous products at the top of the solids cooler 14 are at a temperature of about 1500° to 2000°F. Before leaving the solids cooler 14 the gaseous products are quenched to a temperature of about 1000° to 1200°F or lower by injection of cold quench liquor. Rapid quenching of the gas prevents plugging of the solids cooler 14 and the gas outlet line with traces of tary material in the gas.

The cooled gas may be subjected to treatment in a separator 16 where any high boiling materials in the quenched gas are separated out. The gas from the separator 16 is then further cooled by passing it through one or more water cooled heat exchangers 18 and 19 to lower the temperature of the gas to about 300°F. The final cooling of the gas to a temperature of about 100°F is carried out in quench tower 17 where the gas is contacted with a circulating quench liquor stream. The quench liquor which is a mixture of aromatic compounds is produced by the process itself since the hydrogasification reaction produces a small amount of aromatic liquid product.

Gas from the quench tower 17 may be passed through a conventional gas purification section where acid gases such as $H_2S$ and $CO_2$ are removed. The purified gas which contains $H_2$ and CO in addition to methane and ethane is then methanated if desired to obtain the methane content and B.T.U. value required in the final product.

It is thought that the invention and many of its attendant advantages will be understood from the foregoing description, and it will be apparent that various changes may be made in the disclosed method without departing from the spirit and scope of the invention or sacrificing all of its material advantages, the forms hereinbefore described being merely preferred embodiments thereof.

I claim:

1. A process for the gasification of carbonaceous materials which process is conducted in the absence of an external heat source and a catalyst, said process comprising the steps of:
    a. feeding a liquid hydrocarbon fuel and an oxygen-containing gas into a partial oxidation generator;
    b. gasifying said liquid hydrocarbon fuel by partial oxidation with said oxygen-containing gas to produce a gaseous mixture of carbon monoxide and hydrogen in about a 1:1 ratio, said gaseous mixture having a temperature range of about 2000° to 3000°F, the heat evolved during said gasification being sufficient to maintain said temperature range;
    c. feeding said gaseous mixture along a path towards the lower end of a substantially vertically oriented high-velocity transfer line reactor,
    d. feeding carbonaceous solid material having a particle size of about 100 – 5000 microns into said gaseous mixture along said path to form a gas-solid mixture, the temperature of said solid material being sufficiently lower than said temperature of said gaseous mixture such that the resultant gas-solid mixture has a temperature of about 1500° to 2000°F.
    e. feeding a hydrocarbon oil feed stock into said gas-solid mixture along said path to form a hydrocarbon oil-gas-solid mixture wherein the weight ratio of solid material to hydrocarbon oil feed stock is at least 5:1 and the weight ratio of gaseous mixture to hydrocarbon oil feed stock is such that the resultant hydrogen to oil ratio corresponds to 25–100% of that required to convert all the hydrocarbon oil feed stock to methane;
    f. passing the hydrocarbon oil-gas-solid mixture upwardly through said substantially vertically oriented high-velocity transfer line reactor at a temperature of about 1500° to 2000°F and a velocity of at least 10 feet per second such that the contact time of the hydrocarbon oil and the gas-solid mixture is about 0.05 to 5 seconds so that hydrogasification of the feed is obtained;
    g. feeding the resultant gas-solid mixture from said transfer line reactor;
    h. separating the solid material from said gas-solid mixture to provide a product having a heating valve in excess of about 400 B.T.U. per cubic foot and a specific gravity of about 0.5 to 0.8; and
    i. cooling the solid material separated from the gas-solid mixture and recycling the cooled solid material, mixing the cooled solid material with further gaseous mixture produced by partial oxidation of the hydrocarbon fuel, said solid material being cooled to a temperature such that it will give the gas-solid mixture said temperature between about 1500° and 2000°F.

2. The process of claim 1 wherein the weight ratio of solid material to hydrocarbon feed stock is 30 to 40:1.

3. The process of claim 1 wherein the gas-solid mixture obtained in step (d) has a temperature of about 1700° to 1900°F.

4. The process of claim 1 wherein the carbonaceous solid material has a particle size of about 100 to 1000 microns in diameter.

5. The process of claim 1 wherein the contact time in step (f) is about 0.25 to 1.0 seconds.

6. The process of claim 1 wherein the velocity in said transfer line is 30 to 50 feet per second.

* * * * *